United States Patent [19]

Yata et al.

[11] Patent Number: 4,469,402

[45] Date of Patent: Sep. 4, 1984

[54] REAR PROJECTION SCREEN

[75] Inventors: Yukio Yata, Chiba; Koichi Inagaki, Hoya; Yoshio Yatabe, Tokyo, all of Japan

[73] Assignee: Mitsubishi Rayon Co., Ltd., Tokyo, Japan

[21] Appl. No.: 386,255

[22] Filed: Jun. 8, 1982

[30] Foreign Application Priority Data

Jun. 15, 1981 [JP] Japan .................................. 56-91896
Dec. 28, 1981 [JP] Japan .................................. 56-212584

[51] Int. Cl.³ ............................................. G03B 21/60
[52] U.S. Cl. .................................................. 350/128
[58] Field of Search ................ 350/126, 127, 128, 129

[56] References Cited

U.S. PATENT DOCUMENTS

| | | | |
|---|---|---|---|
| 2,510,344 | 6/1950 | Law | 350/128 |
| 2,529,701 | 11/1950 | Maloff | 350/128 |
| 2,738,706 | 3/1956 | Thompson, Jr. | 350/127 |
| 2,870,673 | 1/1959 | Schwesinger | 350/128 |
| 3,218,924 | 10/1965 | Miller | 350/129 |
| 3,257,900 | 6/1966 | Goodbar et al. | 350/129 |
| 3,279,314 | 10/1966 | Miller | 350/126 |
| 3,578,841 | 5/1971 | Elmer | 350/127 |
| 3,830,556 | 8/1974 | Bratkowski | 350/128 |

FOREIGN PATENT DOCUMENTS

| | | |
|---|---|---|
| 81301520.3 | 10/1981 | European Pat. Off. . |
| 2276605 | 1/1976 | France . |
| 98590 | 4/1923 | Switzerland . |
| 656651 | 8/1951 | United Kingdom . |

*Primary Examiner*—Richard A. Wintercorn
*Attorney, Agent, or Firm*—Brumbaugh, Graves, Donohue & Raymond

[57] ABSTRACT

Provided is a rear projection screen having a front surface receiving light rays from a projector and a viewing surface formed with a lenticulated surface in which lenticules each consisting of a crest, troughs and flanks interconnecting the crest and trough are continuously laid. The flank surface is provided with, on at least a part thereof, a total reflecting surface on which all light rays impinging thereto are reflected and then emanate from the crest through a medium interface thereof. Further, a concave surface is provided in each crest portion.

13 Claims, 28 Drawing Figures

ANGLE OF FIELD OF VIEW

ANGLE OF FIELD OF VIEW

ANGLE OF FIELD OF VIEW

ANGLE OF FIELD OF VIEW

REAR PROJECTION SCREEN

BACKGROUND OF THE INVENTION

The present invention relates to a rear projection screen suitable for use as, for example, a screen for video projectors and, more particularly, to a rear projection screen having a greater angular field of vision on the viewing side and an increased brightness.

Rear projection screens have been widely available for video projectors, microfilm readers and computer display systems, and various studies and attempts have been made for improving the light transmitting characteristics of the rear projection screen for attaining a greater angular field of vision, higher contrast and higher resolution. As a measure for achieving these objects, it has been proposed to use, solely or in combination with a lens or a diffusion plate, a lenticulated surface having a multiplicity of minute cylindrical lenses (lenticules) arranged contiguously.

The screen having the lenticulated surface is effective in diffusing the light impinging thereon. More specifically, a lenticulated surface having a multiplicity of minute vertically extending cylindrical lenses arranged contiguously on a vertical plane laterally diffuses the light, while the lenticulated surface having a multiplicity of minute horizontally extending cylindrical lenses arranged contiguously on a vertical plane longitudinally diffuses the light. When this lenticulated surface is used as a screen, the maximum diffusion angle is varied largely depending on whether the lenticulated surface is faced to the incident light, i.e. towards the light source, or to the viewer. Namely, as is well known to those skilled in the art, it is possible to obtain a greater diffusion angle when the surface is faced to the light source than when the same is faced to the viewer.

In general, however, each lenticule of the lenticulated surface of the kind described has a circular cross-section so that the angle of diffusion of light is considerably small. In consequence, the brightness is drastically lowered disadvantageously in each region of viewing angles exceeding 30° at each side of the axis, as will be seen from FIG. 21. This reduction of brightness causes not only the problem that the picture surface is darkened when viewed from the region out of the viewing angle of 30° but also a problem that the picture surface becomes completely invisible due to a surface reflection in bright circumstance under the influence of ambient light.

SUMMARY OF THE INVENTION

Accordingly, an object of the invention is to overcome the above-described problems of the prior art by providing a novel rear projection screen.

To this end, according to the invention, there is provided a rear projection screen having a lenticulated surface formed on at least the viewing side surface of a medium (a transparent optical medium), and wherein said lenticulated surface includes contiguous lenticules each having a crest and troughs interconnected by flanks, wherein the flank is provided with a total reflection surface so that the all light rays impinging thereon or upon are totally reflected and emanate through at least a portion of the crest, the crest being provided with a concaved surface formed therein.

The invention aims, as another object, at providing a rear projection screen which can be readily cast or moulded with a prolonged life of the mould and which has a lenticulated surface.

According to the invention, there is also provided a rear projection screen having a plurality of contiguous lenticules formed on at least the viewing side surface of a medium each lenticules having a crest and by interconnected through flanks, wherein the flank is provided with a total reflection surface such that the light rays impinging thereon or upon are totally reflected and emanate through the crest, and wherein the crest is provided in its central portion with a concaved surface and flat surfaces at both sides of the central concaved surface.

The invention aims, as still another object, at providing a rear projection screen having, a specific diffusion effect presented by a lens formed on the other side of the medium.

The invention will be more readily understood from the following description of the preferred embodiments thereof with reference to the accompanying drawings.

BACKGROUND OF THE INVENTION

Figure 24:
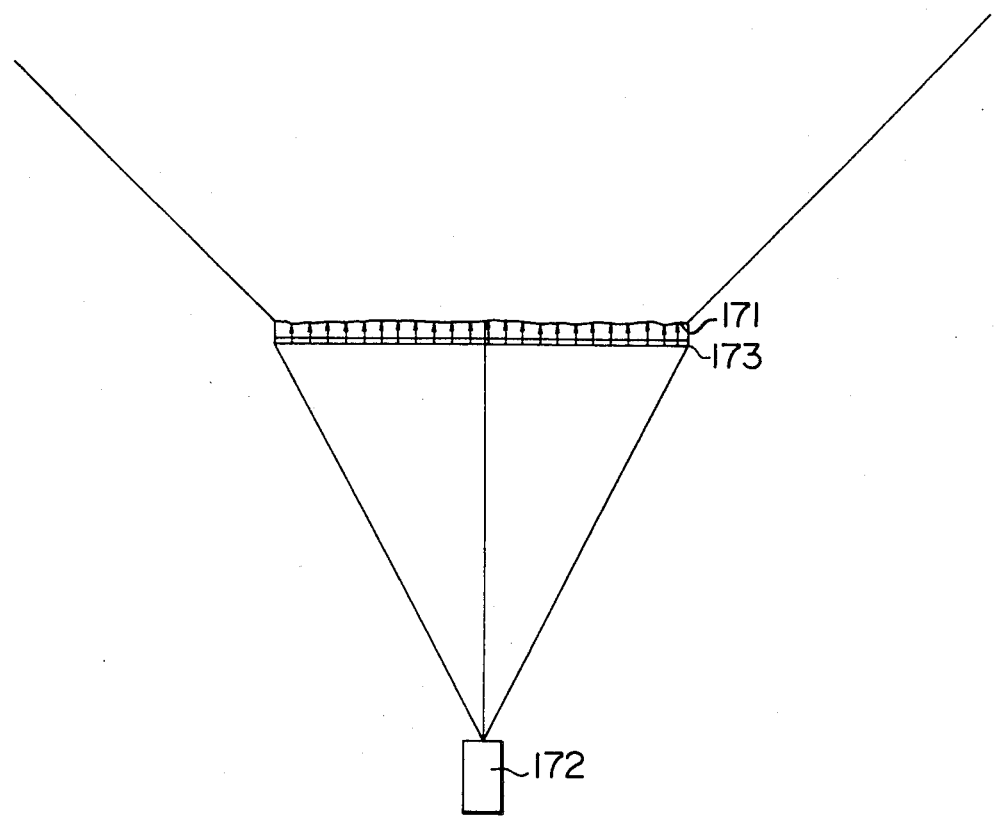
FIG. 24 is a plan view illustrating a general arrangement of a projection system using the rear projection screen of the present invention.

Before the embodiments of the present invention are described, the general arrangement of a projection system using a rear projection screen embodying the invention will be first explained with specific reference to FIG. 24.

In FIG. 24, light rays diverging from a projector 172 impinge upon the rear surface of a rear projection screen 171 through a Fresnel lens 173 which converts the diverging light rays into parallel ones. The light rays transmitted through the medium of the rear projection screen 171 in parallel relation are dispersed from the front surface of the rear projection screen 171 in a suitable viewing angle.

Figure 1:
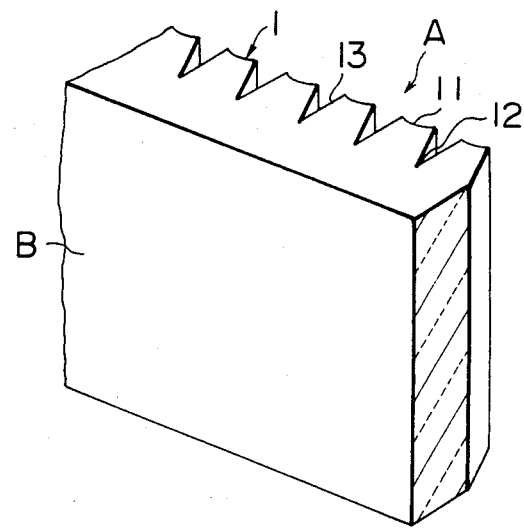
FIG. 1 is a perspective view of a portion of a rear projection screen in accordance with an embodiment of the invention.
Figure 2:
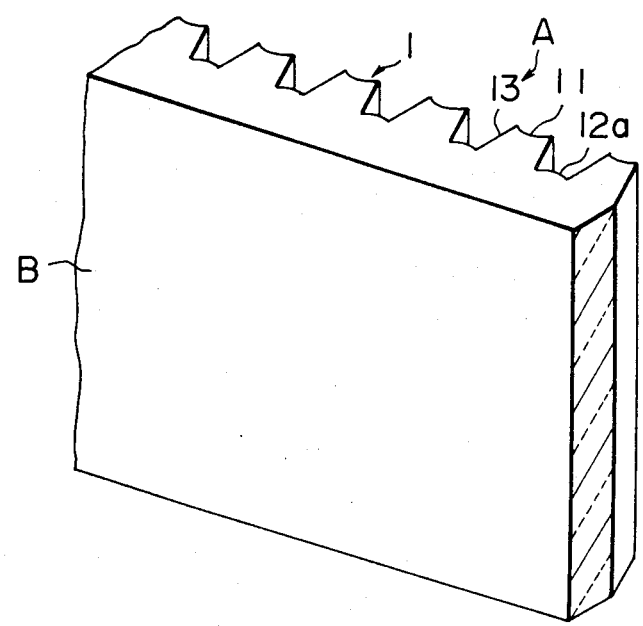
FIG. 2 is a perspective view of a portion of a rear projection screen as a modified form of the embodiment shown in FIG. 1, having lens surfaces formed on troughs of each lenticule.
Figure 3:
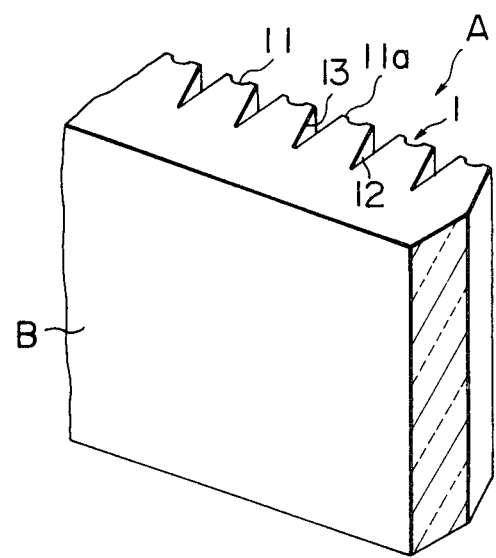
FIG. 3 is a perspective view of a rear projection screen of another modification of the embodiment shown in FIG. 1, having a recessed surface and flat surfaces formed in the crest of each lenticule.
Figure 4:
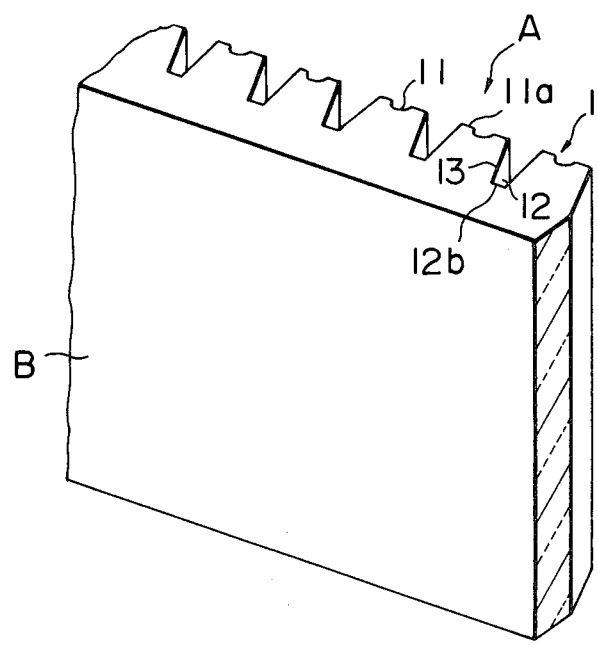
FIG. 4 is a perspective view of a rear projection screen of a modification of the embodiment shown in FIG. 3, having flat surfaces formed on the troughs.

FIGS. 1 thru 5 show rear projection screens embodying the invention. These Figures show specific portions of the screens in perspective views from the rear sides thereof. The rear projection screens of these embodiments have a so-called lenticulation formed on the viewing side A thereof, the lenticulation consisting of a multiplicity of contiguous lenticules 1 each having a crest 11, troughs 12 and flanks 13 interconnecting the crest 11 and the troughs 12. In each lenticule, a total reflection surface is formed on at least a portion of each flank 13 such that the light rays impinging upon the flank 13 is totally reflected and emanates mainly through the crest 11 as will be detailed later. In addition, a concaved surface is formed in the crest of each lenticule. FIGS. 1 thru 5 show practical forms of the rear projection screen. More specifically, FIG. 1 shows the most basic form having minimal essential features of the invention. In the rear projection screen shown in FIG. 2, lens surfaces 12a are also formed on the troughs 12 as in one exemplified form. The rear projection screen shown in FIG. 3 has, in addition to the essential features shown in FIG. 1, flat surfaces 11a formed in the crest 11 of each lenticule. The rear projection screen shown in FIG. 4 has, in addition to the features shown in FIG. 3, flat portions 12b on troughs. In the rear projection screen shown in FIG. 5, the flat portions in FIG. 4 are substituted by lens surfaces 12a.

Figure 5:
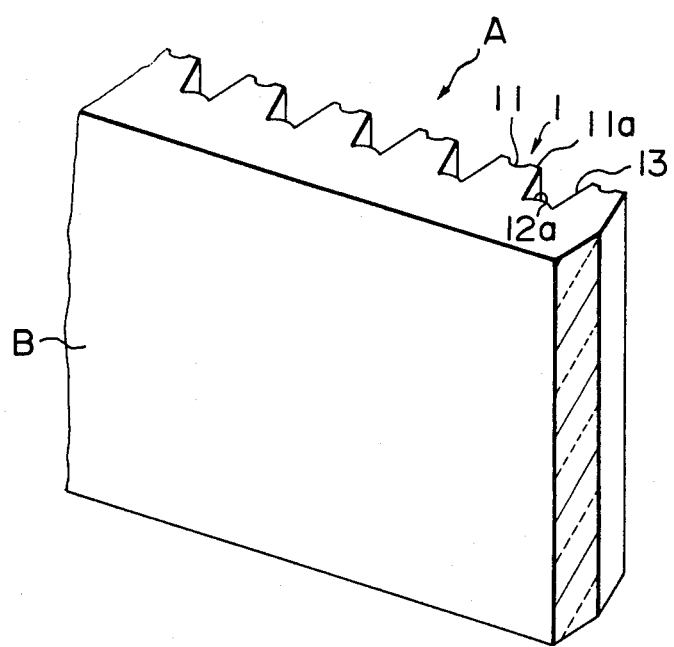
FIG. 5 is a perspective view of a rear projection screen of another modification of the embodiment shown in FIG. 3, having lens surfaces formed on the troughs.
Figure 6:
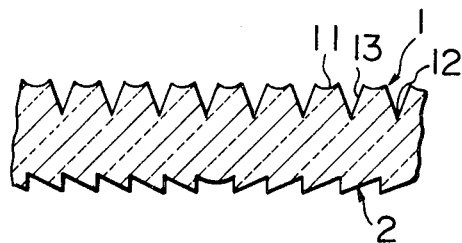
FIG. 6 is a sectional view of a portion of a rear projection screen as a modified form of the embodiment shown in FIG. 1, having a Fresnel lens formed on the projecting side surface.
Figure 7:
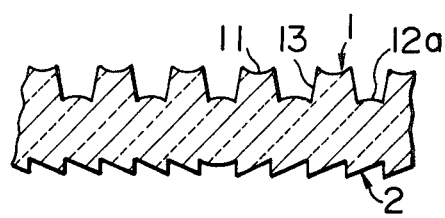
FIG. 7 is a sectional view of a portion of a rear projection screen as a modified form of the embodiment shown in FIG. 2, having a Fresnel lens formed on the projecting side surface.
Figure 8:
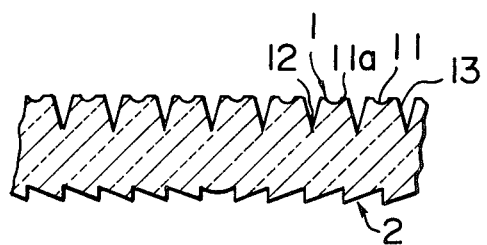
FIG. 8 is a sectional view of a part of a rear projection screen as a modified form of the embodiment shown in FIG. 3, having a Fresnel lens formed on the projecting side.
Figure 9:
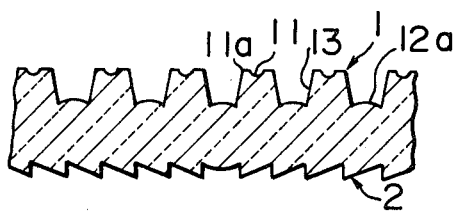
FIG. 9 is a sectional view of a part of a rear projection screen as a modified form of the embodiment shown in FIG. 5, having a Fresnel lens formed on the projecting side surface.

In the embodiments described hereinbefore, the projecting side B of the medium has a flat surface. It is, however, effective and advantageous to form a Fresnel lens on the projecting side B. FIGS. 6 thru 9 show in section essential parts of rear projection screens of such an embodiment. More specifically, the rear projection screen shown in FIG. 6 has a basic construction the same as that shown in FIG. 1 but is provided with a Fresnel lens 2 formed on the projecting side surface thereof. Similarly, FIGS. 7, 8 and 9 show rear projection screens having constructions the same as those of the screens shown in FIGS. 2, 3 and 5, respectively, with Fresnel lenses formed on the projecting side surfaces thereof. Circular Fresnel lenses are generally used, and the focal length of the Fresnel lens is suitably selected in accordance with the uses. For instance, in the case of the rear projection screen for large-sized video projector, the focal length f is usually between 1.0 and 1.2 m. The Fresnel lens may be formed not only in the above-mentioned four embodiments but also in various other forms.

Figure 10:
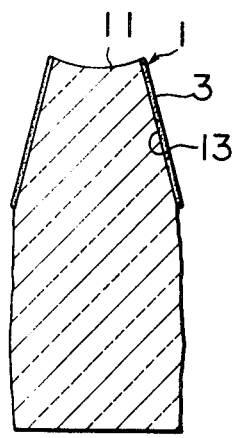
FIG. 10 is an enlarged sectional view of a lenticule in such a type of the rear projection screen as shown in FIG. 1, having a light absorption layer formed on each total reflection surface.
Figure 11:
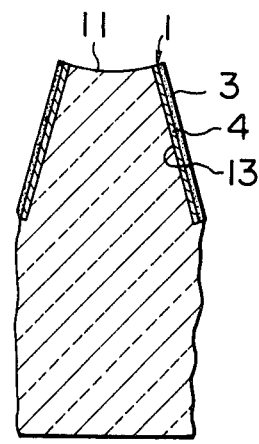
FIG. 11 is an enlarged sectional view of another modified lenticule of the rear projection screen as shown in FIG. 10, having a reflecting layer and a light absorption layer formed on each total reflection surface.
Figure 12:
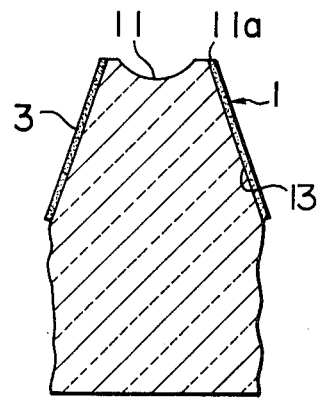
FIG. 12 is an enlarged sectional view of another modified lenticule of the rear projection screen as shown in FIG. 10, having a light absoprtion layer formed on each total reflection surface.
Figure 13:
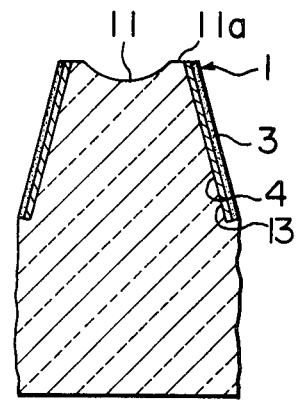
FIG. 13 is an enlarged sectional view of another modified lenticule of the rear projection screen as in FIG. 10, having a reflecting layer and a light absorption layer formed on each total reflection surface.

FIGS. 10 through 13 show still other embodiments which are improved to provide a higher contrast. More specifically, FIG. 10 shows a rear projection screen in which a light absorption layer 3 is formed on the total reflection surface of the embodiment shown in FIG. 1, while, in the rear projection screen shown in FIG. 11, a reflecting layer 4 of a substance having smaller refraction index than the medium, an evaporated metal film, reflective paint or the like is formed between the total reflection surface and the light absorption layer 3 to eliminate the absoprtion loss in the absorption layer 3. In the rear projection screens shown in FIGS. 10 and 11, it is possible to make an efficient use of the total reflection surface which does not directly transmit the light rays to the viewing side A, so that the contrast of the screen can be improved remarkably. The same effect is obtained in rear projection screens shown in FIG. 12 or 13 in which the light absorption layer 3 (FIG. 12) or the combination of the reflecting layer 4 and the light absorption layer 3 is formed (FIG. 13) on the total reflection surface shown in FIG. 3. Although the rear projection screens shown in FIGS. 10, 11, 12 and 13 have basic constructions the same as that shown in FIG. 1 or FIG. 3 in principal points, it will be clear to those skilled in the art that the improvement in the contrast achieved in these four embodiments can be obtained with constructions of other embodiments than that shown in FIG. 1 or FIG. 3.

A primary feature of the rear projection screen of the invention resides in that, in each of the lenticules, a total reflecting surface is formed on each flank 13 in such a manner that the light rays impinging upon the flank 13 are totally reflected and then emanate through the top surface of the crest 11. The total reflection surface has also to be formed in such a manner that the total-reflected light rays and the light rays directly reaching the crest 11 are never totally-reflected at the medium interface of the crest 11. The angle $\theta$ formed between the total reflection surface and the optical axis is determined by the refraction index n of the medium. The angle $\theta$ can be numerically determined as follows.

Figure 14:
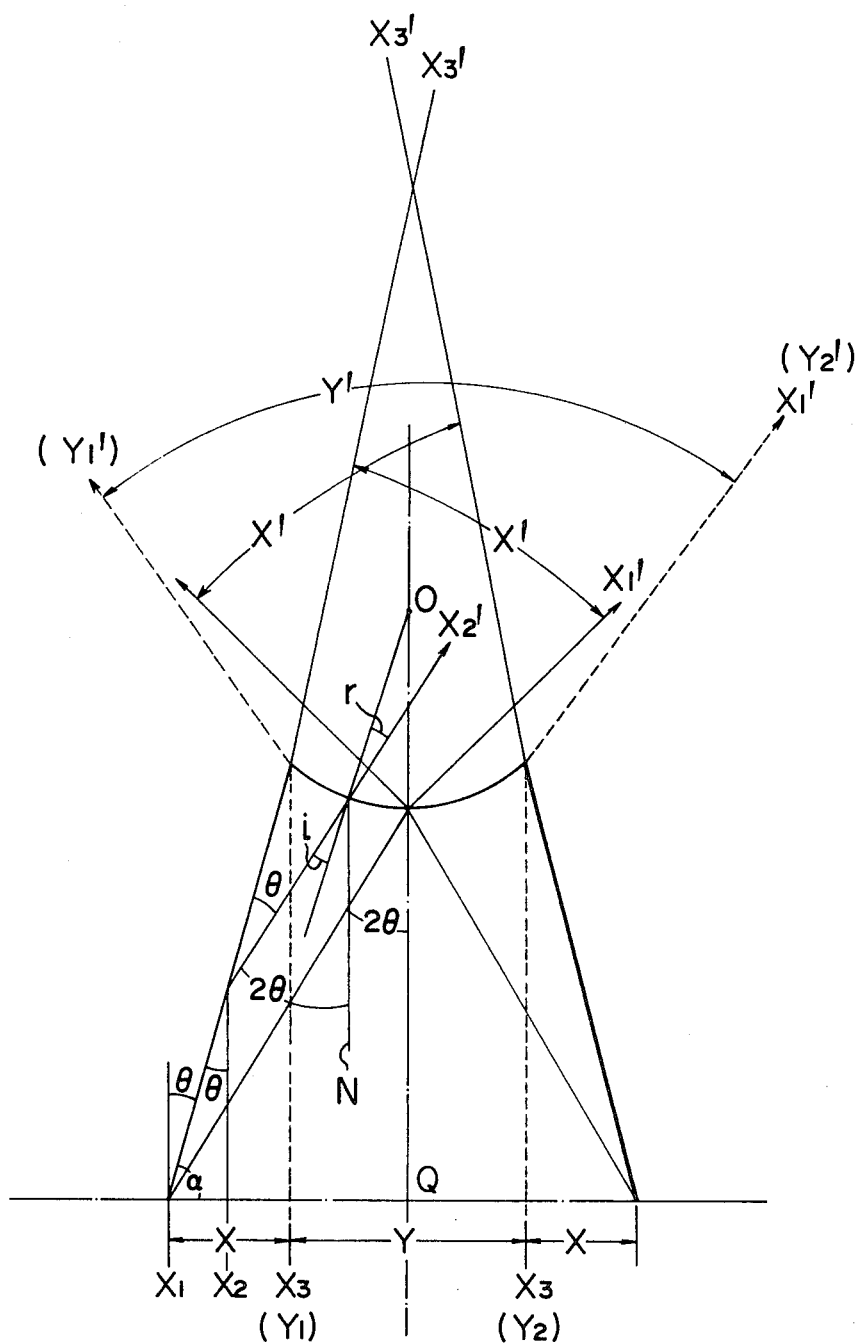
FIG. 14 is an illustration of the light-transmitting characteristics of the total reflection surfaces of the lenticule shown in FIG. 1.

Suppose here that a light ray $X_2$ parallel to the vertical axis N impinges upon the total reflection surface at an angle $\theta$ as shown in FIG. 14, and emanates through the crest 11 after a total reflection. This light ray intersects the vertical axis N, which is the optical axis, at an angle of $2\theta$. The condition upon which the light ray $X(X_1, X_2, X_3)$ emanuates through the crest 11 is that the incidence angle i of the ray $X_2$ and angle $2\theta$ of the ray $X_1$ to each point of the concaved surface must be smaller than the total reflection angle of the concaved surface because the total reflection at the interface of the concaved surface is to be avoided. Angle i is affected by angle $\theta$, which in turn is affected by the refraction index n of the medium. Thus the condition for $\theta$ can be expressed as follows from the formula of total reflection.

$$n \sin 2\theta < 1$$

This formula is transformed as follows $$\sin 2\theta < 1/n$$

Thereore, the incident angle $2\theta$ is expressed as follows.

$$2\theta < \sin^{-1} 1/n$$

$$\theta = \tfrac{1}{2} < \sin^{-1} 1/n$$

The incidence angle to the concaved surface takes the maximum value $2\theta$ when the light ray $X''_1$ from the total reflection surface impinges upon the medium interface at the center of the crest 11 as shown in FIG. 14, i.e. when the ray impinges upon the point of intersection of the optical axis OQ and the medium interface.

From the equation above, the angle $\alpha$ to be formed between the total reflecting surface and the horizontal plane is given as follows.

$$\alpha > 90° - \tfrac{1}{2} \sin^{-1} 1/n$$

Assuming here that the medium is an acrylic resin having a refraction index of 1.492, the angle $\alpha$ is calculated as follows.

$$\alpha > 90° - \tfrac{1}{2} \sin^{-1} 1/1.492$$

$$\alpha > 90° - \tfrac{1}{2} \times 42.09°$$

$$\alpha > 68.96°$$

Thus, it is essential that the angle $\alpha$ be selected to be 69° or greater. If the angle $2\theta$ of the ray passing the crest 11 excessively approaches the critical angle or the total reflection angle which is 42.09°, the rate of internal reflection in the crest 11 is increased. This suggests that the angle $\alpha$ preferably approximates 90°. However, since a too large angle $\alpha$ of total reflection surface imposes a difficulty in the fabrication of the rear projection screen, it is advantageous that the angle is in a range between 70° and 80° when the acrylic resin is used for the medium.

As previously mentioned, it is essential according to the invention that the crest 11 has a concaved surface.

Figure 15:
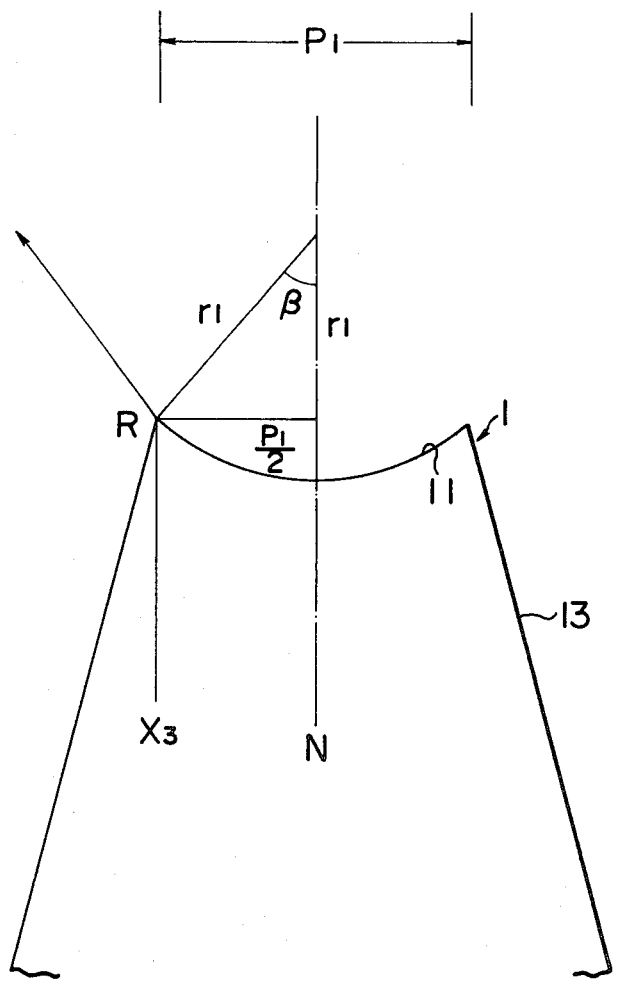
FIG. 15 is an illustration of the state of diffusion of light in the concaved surface of the lenticule shown in FIG. 1.

The above-mentioned explanation has been made on the assumption that the radius of curvature of the concave surface is relatively large in comparison with the width of the crest 11. However, if the radius becomes small approaching to or below the width of the crest 11, the size of the radius should be considered in view of total reflection to the medium interface of the concave surface. Namely, it is necessary that the light rays reaching this concaved surface are not toally reflected. To this end, it is necessary that the following condition is met. Referring to FIG. 15, the width of the crest 11 is represented by $P_1$, the radius of curvature of the concaved surface is represented by $r_1$ and the edge of the crest 11 is represented by R. The angle $\beta$ formed between the neutral axis N and the radius $r_1$ which reaches the edge R is given as follows.

$$\sin\beta = \frac{\frac{P_1}{2}}{r_1} = \frac{P_1}{2r_1}$$

Since this angle $\beta$ is the angle of incidence of the ray $X_3$ passing the edge R, the radius of curvature $r_1$ should be determined to meet the condition of $$r_1 = \frac{P_1 n}{2}.$$

In the embodiment described heretofore, as well as in the embodiments which will be described later, the concaved surface may have an arcuate section, hyperbolic section, parabolic section or the like.

Figure 21:
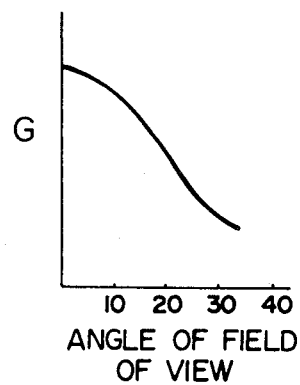
FIG. 21 is a graph showing the light-transmitting characteristics of the conventional lenticule with the relative brightness of transmitted light plotted a viewing angle in degrees.
Figure 22:
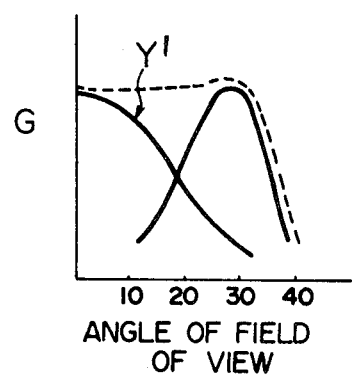
FIG. 22 is a graph showing the light-transmitting characteristics of the lenticule shown in FIG. 16.

The lenticule 1 of the rear projection screen in accordance with the invention is constructed as described. Therefore, as shown in FIG. 14, the light rays X coming into the total reflection surface on the flank 13 emanate from the crest 11 as rays X' to form a pencil of light rays. The light rays Y coming into the crest 11 is refracted in the same way as the case of a concaved lens and emanate in a diverging manner as denoted by Y'. Therefore, in the lenticulated screen of the invention, the totally reflected ray X" emanates in the area of angular field of vision in excess of 30° from the center axis, while the rays Y" which will pass the crest 11 emanates in the same manner as the conventional lenticulated surface, as will be seen from FIG. 22. In consequence, the image or picture is visible over a wide range of angular field of vision based on the combination of both rays X' and Y'. It will be seen that, as shown in FIG. 21, the angular field of vision presented by the conventional rear projection screen is smaller than that presented by the screen of the invention. According to the invention, the transmission characteristics for the rays X" and Y" can be widely selected by suitably determining various factors such as the pitch of the lenticules 1, angle of flanks 13, height of the flanks 13, shape of the concaved surface, focal distance of the lens surface 12a and so forth.

Figure 16:
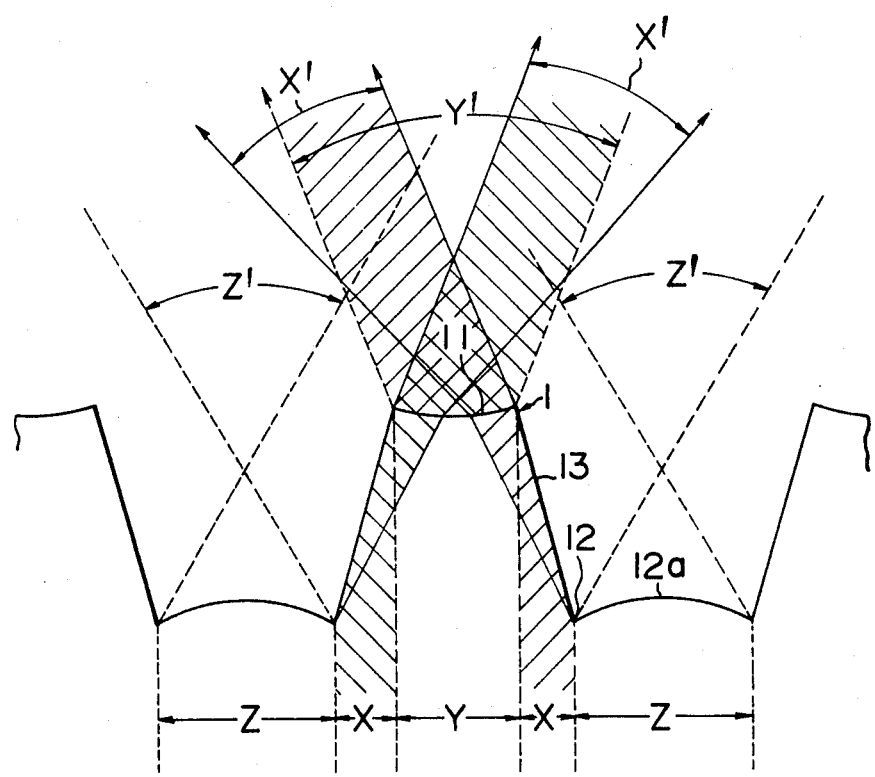
FIG. 16 is an illustration of the light-transmitting characteristics of the lenticule shown in FIG. 2.

Explanation is made to the embodiment shown in FIG. 2 and FIG. 16. The rear projection screen which has a multiplicity of lenticules 1 each having a crest 11, troughs 12 and flanks 13, a lens surface 12a is provided to each trough 12. More specifically, as shown in FIG.

16, the lens surface 12a is formed on the bottom surface of each trough 12. The light rays Y coming into the portion of the concaved surface of the crest 11 and the light rays X coming into the portion of the flank 13 are diverged as in the case of the preceding embodiment. In this case, however, the light rays Z coming into the lens surface 12a are refracted and diverged as denoted by Z'. The lens surface 12a may be a convexed lens as illustrated or, alternatively, a concaved lens. Preferably, the lens surface 12a is so constructed that the light rays being to emanate from this lens surface 12a are not totally reflected. To this end, it is advisable to select a suitable curvature of this surface in accordance with the same idea as that explained before in connection with FIG. 15, although the direction of convexity or concavity is reversed.

The rear projection screen having lenticules as illustrated in FIG. 2 and explained in connection with FIG. 16, offers an advantage that, while the totally reflected light ray X″ emanates in the area remote from the axis and the light ray Y″ coming to the concaved surface in the crest 11 emanates in the area close to the axis, the light ray Z″ emanating from the lens surface 12a on the bottom of the trough is superposed to the ray Y′. In consequence, it is possible to obtain a rear projection screen which can assure a larger angular field of vision and a greater brightness in the central area.

Hereinunder, explanation will be made as to the light transmitting characteristics of the lens 1 in the lenticule shown in FIG. 3 and FIG. 17. The light rays X coming into the flank 13 is totally reflected as indicated by $X_1$ and $X_2$ and are made to emanate from the crest 11 as $X_1'$ and $X_2'$ after refraction. On the otherhand, the light rays Y coming into the concaved surface in the crest 11 as $Y_1$, $Y_2$, and $Y_3$ emanate therefrom as $Y_1'$, $Y_2'$ and $Y_3'$. In this case, however, the light ray $W_1$ coming into the flat surfaces 11a formed at both sides of the concaved surface in the crest 11 runs straight and emanate as $W_1'$. The flat surface is formed in such a flat shape as represented by straight lines MN and OP in FIG. 17. Since the flat surface serves also to prevent both sides of the crest 11 of the lens 1 from becoming excessively keen, the surface may have the form of a convexed lens or a concaved lens or other simialr curved shape. Gentle convexed or concaved surfaces are preferable.

The light rays totally reflected by the total reflection surface must emanate through the crest 11 having the concaved surface without being totally reflected.

Although only the left side part of the lenticule 1 is mentioned in the foregoing explanation of light reflection and transmission at the total reflection surface, it will be clear to those skilled in the art that the reflection and transmission are the same also in the right half part of the lens 1.

Figure 17:
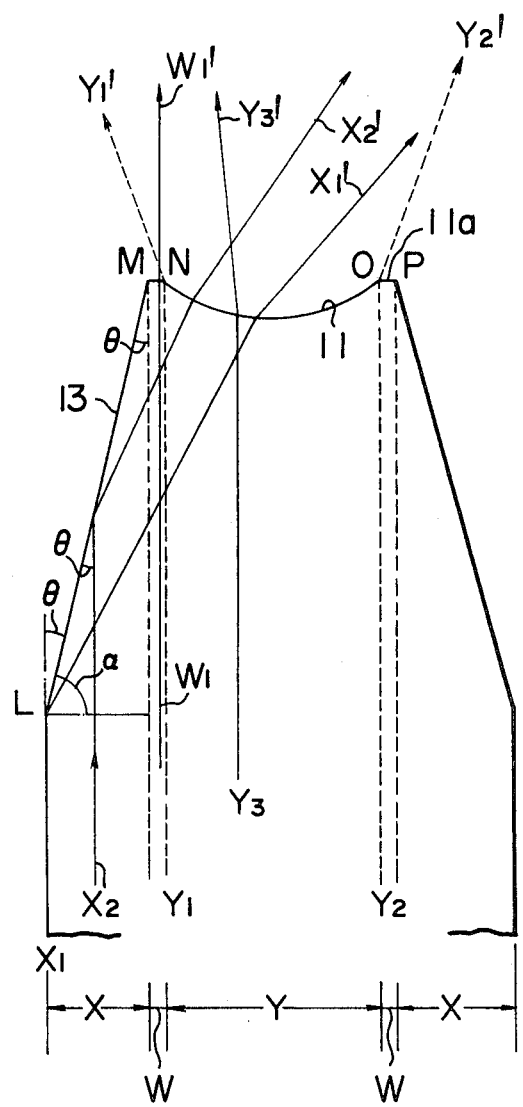
FIG. 17 is an illustration of the light-transmitting characteristics of the lenticule shown in FIG. 3.
Figure 18:
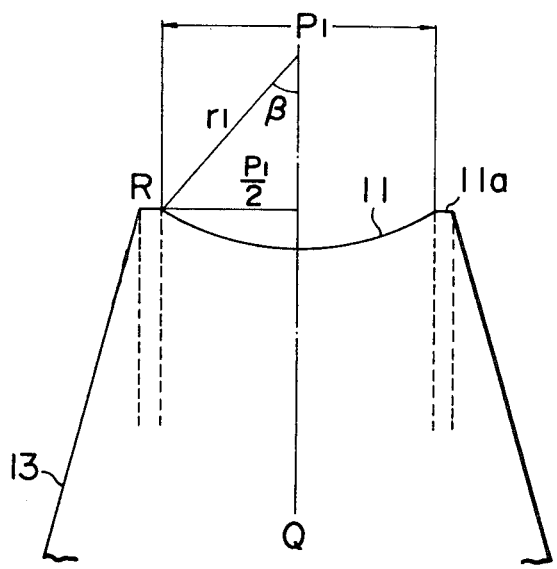
FIG. 18 is an illustration of the state of diffusion of light of the concaved surface of the lens shown in FIG. 3.

The shape of the concaved surface in the crest of the lenticule 1 in FIG. 17 is illustrated in FIG. 18. This Figure is materially identical to that of FIG. 15. Therefore, the shape of the concaved surface should be determined to meet the condition of $$r_1 = \frac{P_1 n}{2}.$$

Figure 19:
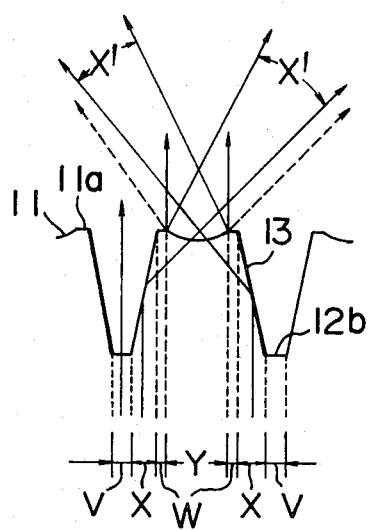
FIG. 19 is an illustration of the light-transmitting characteristics of the lenticule shown in FIG. 4.

FIG. 19 is an illustration of the transmission characteristics in the lenticule shown in FIG. 4. This Figure is materially identical to FIG. 17 except that a flat surface 12b is formed on the trough. Therefore, while the light ray X makes a large refraction and emanates as X′ through the concaved surface of the crest 11, the light ray Y coming into the concaved surface is refracted and diverged. On the other hand, the light rays W and V coming into the flat surfaces 11a and the flat portion 12b on the trough 1 run straight.

Figure 20:
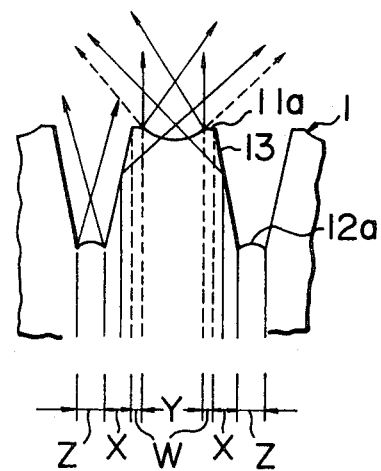
FIG. 20 is an illustration of the light-transmitting characteristics of the lenticule shown in FIG. 5.

A discussion will be made hereinunder as to the light transmitting characteristics in the lenticule shown in FIG. 20. This lenticule well resembles that shown in FIG. 16, and the sole difference resides in whether there is a flat surface 11a at each side of the concaved surface in the crest 11. Therefore, in the lenticule shown in FIG. 20, the light rays X coming into the total reflection surface are totally reflected and emanate through the concaved surface, while the light rays Y coming into the concaved surface emanate in a diverging manner. In addition, the light rays W coming into the flat surface run straight, whereas the light rays Z coming into the lens surface 12a is refracted and scattered.

Figure 23:
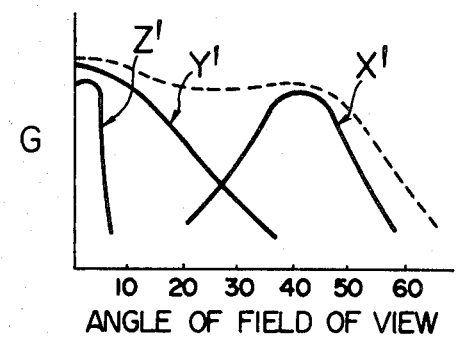
FIG. 23 is a graph showing the light-transmitting charactersitics of the lenticule shown in FIG. 20.

The lenticules shown in FIGS. 17 through 20 differ from the preceding ones (FIGS. 14 through 16) in that flat surfaces 11a are formed at both sides of the concaved surface of the crest 11. However, the rear projection screens having lenticules shown in FIGS. 17 through 20 exhibit light transmitting characteristics substantially identical to those types of the screens as shown in FIGS. 14 through 16. For instance, the lenticules shown in FIGS. 17 through 20 exhibit characteristics substantially identical to that shown in FIG. 23.

In the foregoing description of the preferred embodiments, it is stated that the medium constituting the rear projection screen is an acrylic resin, because the acrylic resin is superior in optical characteristics as well as in the workability and formability. The use of the acrylic resin, however, is not exclusive and various other materials such as vinyl chloride resin, polycarbonate resin, olefin resin, styrene resin and the like can be used as the medium. With using these materials, the rear projection screen of the invention can be fabricated by extrusion, heat press or injection molding. The dimension of each part of the rear projection screen of the invention may vary depending on the uses. For instance, in the lenticular lens of the screen shown in FIGS. 15 and 16, the width $P_1$ of the crest 1 is selected to be 0.3 to 1.5 mm, while the width of each trough 2 with the lens surface 12a has a width of 0.3 to 1.5 mm, so that the lenticule as a whole has a pitch of 0.6 to 3 mm. On the other hand, the height of the lens 1 is preferably selected to range between 0.3 and 2 mm.

It is quite possible to form the lenticulated screen in which troughs 12 is narrowed as shown in FIGS. 1 and 3. However, in the case of the lenticulated screen in which the troughs 12 are provided with the lens surfaces or the flat surfaces as shown in FIGS. 2, 4 or 5, the parting or separation from the mould is very much facilitated as compared with the lenticulated screens shown in FIGS. 1 and 3, so as to offer a great advantage from the view point of the manufacturing. The flanks 13 need not always be linear but may be curved.

The length of the total reflection surface is determined suitably in such an extent that the light ray X from total reflection surface of one side, e.g. left side, does not reach the medium interface of the other side, e.g. right side, across the optical axis OQ.

In order to further improve the light diffusion characteristics in both of vertical direction and horizontal direction in the rear projection screen of the invention, it is possible to provide the medium with specific light diffusing means. As the light diffusing means, it is possible to uniformly mix and disperse, in the synthetic resin constituting the medium, an inorganic diffusion agent such as silicon dioxide, calcium carbonate, aluminum oxide, titanium dioxide, barium sulfate, zinc oxide, fine glass powders or the like. It is also possible to use, a diffusion agent such as polystyrene, stylene-acrylonitrile copolymer being uniformly mixed and dispersed in the medium, but would never be molten nor chemically react with the medium. The light diffusing means may be constituted by a layer containing the above-mentioned diffusion agent or agents. It is still possible to constitute fine roughness (convexities and concavities) on the incident surface and/or the lens surface of the projecting side. By the use of such light diffusing means, it is possible to relax the peak of the curve shown a dotted line in FIG. 22 or 23. In those figures, G means Gain and is calculated as follows:

$$G = \frac{\text{foot lambert}}{\text{foot-candle}}$$

Go is a Gain at 0° C.

The light diffusing means contribute also to the diffusion of light in the vertical directions of the screen. It is also effective to add a suitable pigment to the medium to obtain an appropriate tone of color. As means for assuring the diffusion of light in the vertical direction, it is possible to integrally incorporate the horizontally extending lenticules.

Practical example of the invention will be explained hereinunder.

EXAMPLE 1

Figure 25:
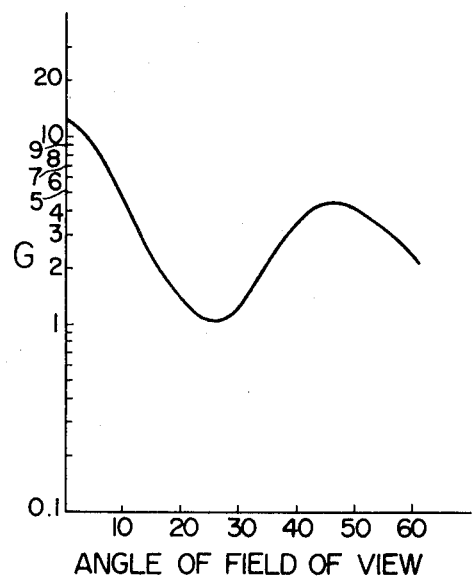
FIG. 25 is a graph showing the light-transmitting characteristics of the screen of Example 1.

A sheet of 3 mm thick was formed from a partially polymerized methylmethacrylate containing silicon dioxide as a light diffusion agent. With this sheet, a screen was formed by a heat press to have lenticules on the viewing side and circular Fresnel lens on the projecting side as shown in FIG. 6. The width of the crest of the lenticules was 0.7 mm, radius of curvature of the concaved surface in the crest was 0.27 mm and the angle α was 74°. Also, the focal length f of the Fresnel lens was 1.2 mm. The light transmitting characteristics of the screen thus formed was evaluated, and a superior light transmitting characteristics were confirmed in which, as show in FIG. 25, the Go value was 12 and G value was 3 even at the position of 45° from the axis, although the value of angle β was 11°

EXAMPLE 2

A screen was formed by a heat press from a sheet similar to that of Example 1. The sheet thus formed had lenticules substantially same as those in FIG. 7 and had a Fresnel lens formed on the projecting side as in the case of Example 1. The width of the crest and the height of the lenticules were 0.7 mm, while the angle α was 74°. The width and the radius of curvature of the lens surfaces on the troughs were 0.7 mm and 0.4 mm, respectively.

Figure 26:
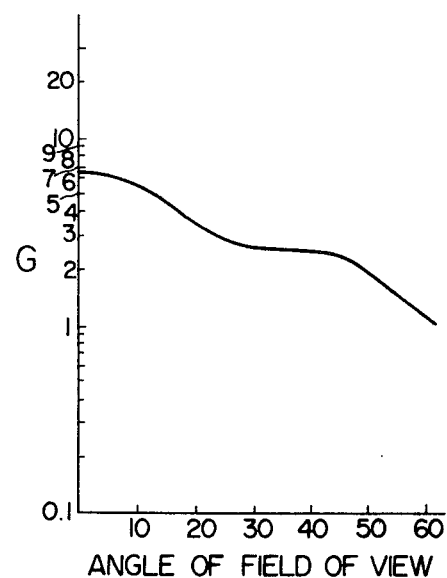
FIG. 26 is a graph showing the light-tranmsitting characteristics of the screen of Example 2.

The light transmitting characteristics of the screen thus formed exhibited, as shown in FIG. 26, a Go value of 6.5 and a β value of 47°, and presented a wide field of vision advantageously.

EXAMPLE 3

Figure 27:
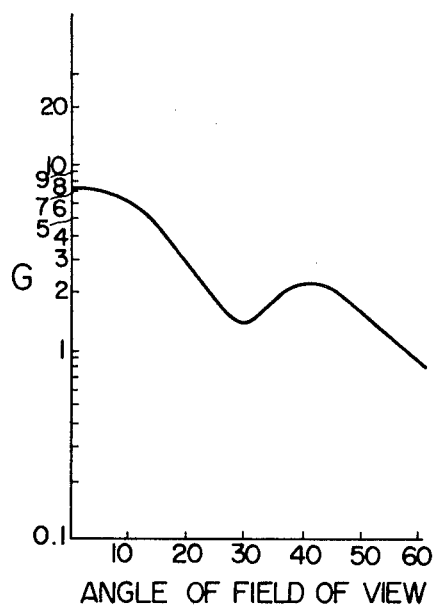
FIG. 27 is a graph showing the light-transmitting characteristics of the screen of Example 3.

A screen of a shape similar to that shown in FIG. 9 was formed from a sheet substantially same as that of Example 1. The width of the concaved surfaces was 0.7 mm, while the width of the flat surface was 0.02 mm. The width of the lens surfaces on the troughs were 0.5 mm and the radius of curvature was 0.4 mm. The focal distance f of the Fresnel lens was 1.2 m. The light transmitting characteristics of the screen thus formed exhibited, as shown in FIG. 27, a Go value of 7.2, while the angle β was 18°. The G value exceeded 1 at the area also between 30° and 50°. Thus, the picture was visible also in the region of angle between 30° and 50°.

EXAMPLE 4

Figure 28:
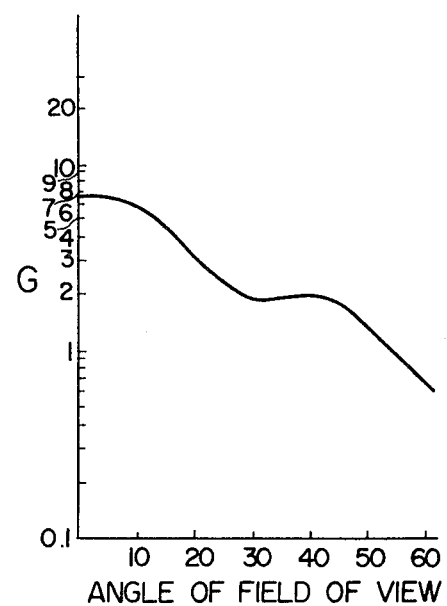
FIG. 28 is a graph showing the light-transmitting characteristics of the screen of Example 4.

A screen of the shape substantially similar to that shown in FIG. 9 was produced from a sheet similar to that of Example 1. The width of the concaved surface 0.6 mm, a height of the lenticules was 0.5 mm and the angle α was 74°. The width of the flat surface was 0.02 mm. The width of the lens surfaces on the troughs was 0.6 mm, while the radius of curvature was 0.43 mm. The focal distance f of the Fresnel lens was 1.2 mm. The screen thus formed had such superior light transmitting characteristics that it exhibited as shown in FIG. 28, a Go value of 6.5, angle β of 25°. The G value in excess of 1 was preserved over the wide area of more than 50° in the field of vision, while the occurrence of Moire pattern was suppressed remarkably.

What is claimed is:

1. A rear projection screen having a viewing side surface, a projection side surface and a medium therebetween and having a plurality of continuous parallel contiguous lenticles formed at least on the viewing side surface so as to form a lenticulated surface thereon each lenticle having a crest and troughs interconnected by flanks, wherein each flank is provided with a total reflection surface so that all light rays impinging thereon from the projection side of the screen in the direction perpendicular to the screen are totally reflected and emanate through at least a portion of said crest of the lenticule without being totally reflected thereby, said crest being provided with a concaved surface formed therein.

2. A rear projection screen according to claim 1, wherein said concaved surface is formed in the central portion of said crest while flat surfaces are formed at both sides of said concaved surface.

3. A rear projection screen according to claim 1 or 2, further including lens surfaces formed on said troughs.

4. A rear projection screen according to claim 1 or 2, further including a Fresnel lens formed on the projecting side of said medium.

5. A rear projection screen according to claim 1 or 2, wherein the angle α or a said total reflection surface satisfies the condition:

$$\alpha \geq 90° - \tfrac{1}{2}\sin^{-1}1/n,$$

where n is the refraction index of medium.

6. A rear projection screen according to claim 1 or 2, wherein said medium is provided with a light diffusing means for diffusing light impinging on the projection surface to increase the angular field of view at the viewing surface.

7. A rear projection screen according to claim 6, wherein said light diffusing means includes a pigment dispersed in said medium.

8. A rear projection screen according to claim 1 or 2, further including a light absorption layer formed on the outer surface of said total reflection surface to improve the contrast of the projected image.

9. A rear projection screen according to claim 1 or 2, further including a reflecting layer and a light absorption layer formed on the outer surface of said reflection surface.

10. A rear projection screen according to claim 1, wherein said concaved surface is formed in the central portion of said crest and wherein concaved surfaces are formed at both sides of said central concaved surface.

11. A rear projection screen according to claim 1, wherein said concaved surface is formed in the central portion of said crest and wherein convexed surfaces are formed at both sides of said central concaved surface.

12. A rear projection screen as claimed in claim 7, wherein said pigment comprises organic material.

13. A rear projection screen as claimed in claim 7, wherein said pigment comprises inorganic material.

* * * * *